Figure 1:
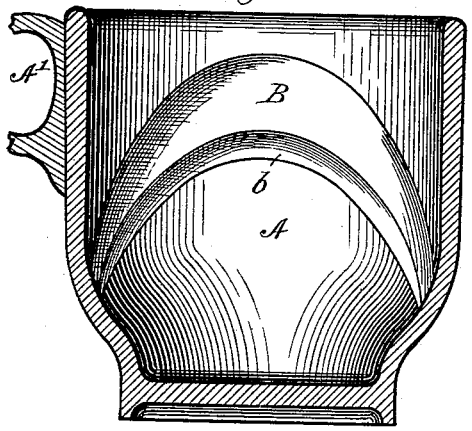

(No Model.) 2 Sheets—Sheet 1.

B. EDGAR.
TEA OR COFFEE CUP.

No. 351,255. Patented Oct. 19, 1886.

WITNESSES
John C. Miller
Percy White

INVENTOR
Butler Edgar
by
his Attorney (No Model.)

2 Sheets—Sheet 2.

B. EDGAR.

TEA OR COFFEE CUP.

No. 351,255.

Patented Oct. 19, 1886.

WITNESSES
John C. Miller
Percy White

INVENTOR
Butter Edgar
by
C. Thons
his Attorney

N. PETERS, Photo-Lithographer, Washington, D. C.

United States Patent Office.

BUTLER EDGAR, OF ESPY, PENNSYLVANIA, ASSIGNOR OF ONE-HALF TO WILLIAM ABBOTT, OF SAME PLACE.

TEA OR COFFEE CUP.

SPECIFICATION forming part of Letters Patent No. 351,255, dated October 19, 1886.

Application filed January 2, 1886. Serial No. 187,435. (No model.)

*To all whom it may concern:*

Be it known that I, BUTLER EDGAR, a citizen of the United States of America, residing at Espy, in the county of Columbia and State of Pennsylvania, have invented certain new and useful Improvements in Tea or Coffee Cups, of which the following is a specification, reference being had therein to the accompanying drawings.

The object of this improvement is to provide the wall of a coffee or tea cup with an inside projection of suitable formation to arrest and hold within the cup the sediment pertaining to coffee or tea while the liquid is being poured or drunk from the cup. These results are obtained by the means illustrated in the drawings herewith filed as part hereof, in which the same letters of reference denote the corresponding parts in the different views.

Figure 2:
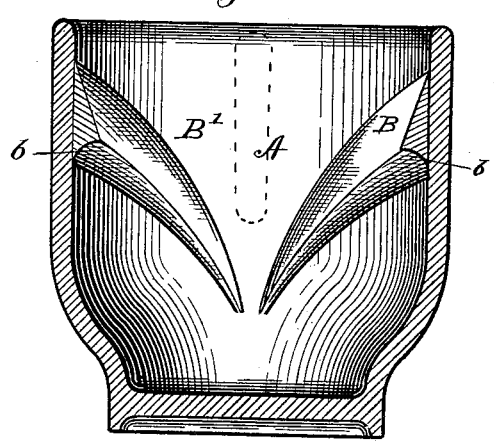
Figure 3:
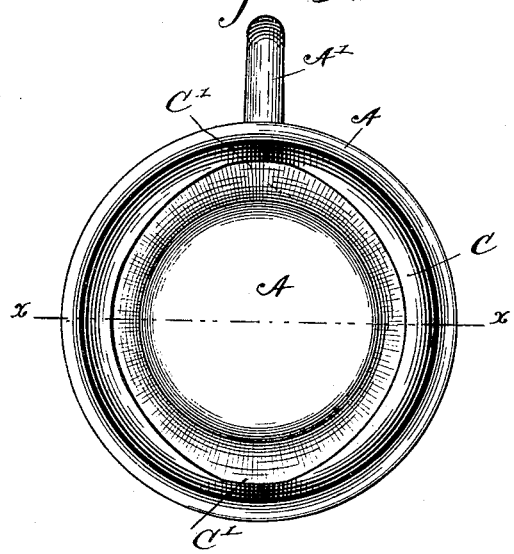
Figure 4:
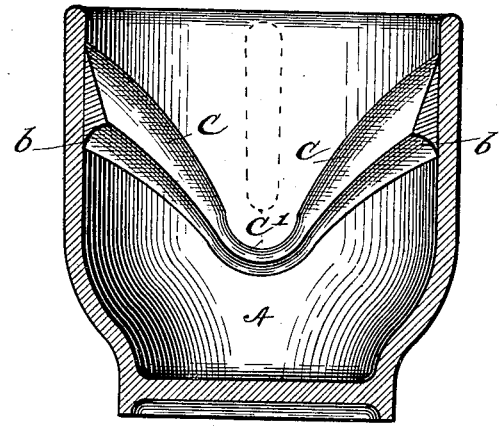
Figure 5:
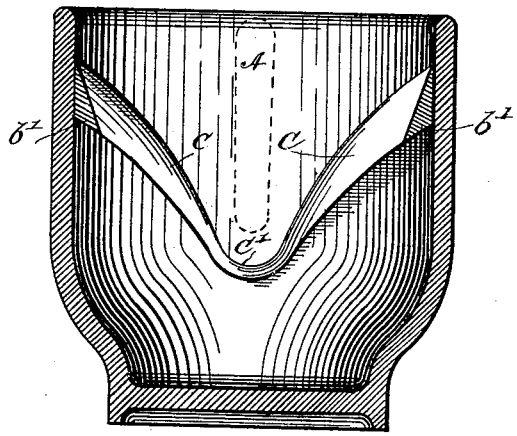
Figure 6:
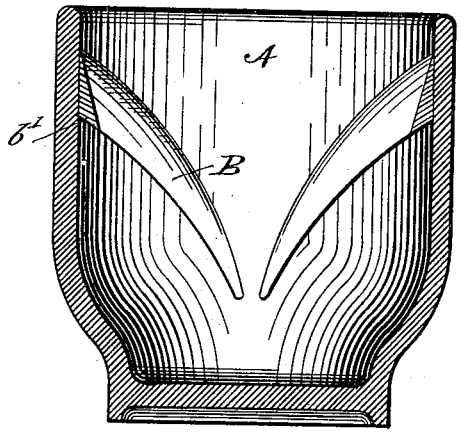

Figure 1 is a sectional representation of a coffee or tea cup having its inside wall provided with projections embodying the features of my improvement. Fig. 2 is a sectional representation of a coffee or tea cup having its inside walls provided with opposite projections embodying the features of my improvement. Fig. 3 is a plan view of a modification representing a sediment-arrester extending from one side of the cup to the other, detachable from the cup, but otherwise substantially of similar construction. Fig. 4 is a transverse vertical section of the same, taken on the line $x\ x$ of Fig. 3. Figs. 5 and 6 represent additional modifications.

A is an ordinary coffee or tea cup, provided, as shown in Fig. 1, with a ridge or projection, B, curved or crescent-shaped, the body located near the top of the cup, and its horns or extremities gradually widening and extending downward along the face or inner wall at will. Thereby—that is, by this particular construction or shape—the power of the arrester is greatly facilitated in arresting and holding the sediment or any solid matter floating in the liquid in the cup, and thereby promoting its utility. Said projection has a concaved lower edge, $b$, which is suitably tapered to a feather edge to the outer part of the body, as is more fully shown in Fig. 2, in which B B' are projections of identical formation with that shown in Fig. 1, and affixed to the wall of the cup in positions opposite each other, for a purpose hereinafter set forth.

Referring to the modifications shown in Figs. 3 and 4, C is the sediment-arrester, made substantially in the form illustrated, and extending from one side of the cup to the other, but detachable therefrom.

Referring to the modifications shown in Figs. 5 and 6, the only difference is, that the lower part of the body of the arresters B C is given an upward inclination, $b'$, instead of the concaved formation. The part C, Fig. 5, is detachable from the cup, and the parts B B' B, Figs. 1, 2, and 6, are permanently fixed to the cup.

A cup provided with projections B B' affixed to its wall at opposite sides of the handle, as shown in Fig. 2, is adapted for use by either right or left handed people.

The detachable arrester (shown in Figs. 3, 4, and 5) is adapted to both right and left handed people, and may also be inserted into cups now in use. The detachable arrester is supported in position shown by the lower part, C', engaging with the inward curve of the lower part of the cup-wall. Its gravity and its expansion by heat from the contents of the cup will cause it to maintain its position when the cup is in use.

When the cup is given an inclined position for the purpose of pouring or drinking its contents, the sediment of the tea or coffee will be arrested and held by the projections or crescent-shaped body, as above described, B B' C. The concaved formation of the lower parts of the projections B B' C (shown in Figs. 1, 2, 3, 4) is to be preferred when the arrester is permanently affixed to the walls of the cup, as the sediment is the more easily removed; but where the arrester is detachable the upward inclination, as shown at $b'$ in Figs. 5 and 6, would be preferable, as the latter construction would have a more positive effect in arresting the sediment, which could be easily and thoroughly removed from the cup when the arrester is detached.

I am aware of the invention of a coffee-pot provided with a transverse ledge below the spout-connection with the body of the same, for the purpose of arresting the sediment and preventing its issue through the spout into the cup. Such construction has been found to be insufficient to prevent entirely the issue of sedimentary matter through the coffee-pot spout, and has, moreover, been found to interfere materially with cleaning the vessel, and is not now in use. I do not claim such features, as the object and result of my improvement is to retain in the cup such sedimentary matter as issues from coffee and tea pots in ordinary use when the liquid is poured therefrom; but What I do claim, and desire to secure by Letters Patent, is—

A cup having a handle, and provided with an arrester on each side thereof, substantially as shown and specified.

In testimony whereof I affix my signature in presence of two witnesses.

BUTLER EDGAR.

Witnesses:
P. A. EVANS,
G. M. QUICK.